United States Patent [19]

Asai

[11] Patent Number: 5,581,416
[45] Date of Patent: Dec. 3, 1996

[54] POLYGONAL MIRROR, AND MANUFACTURING PROCESS AND MOLD THEREOF

[75] Inventor: Shingo Asai, Toyokawa, Japan

[73] Assignee: Minolta Camera Kabushiki Kaisha, Osaka, Japan

[21] Appl. No.: 141,489

[22] Filed: Oct. 22, 1993

Related U.S. Application Data

[62] Division of Ser. No. 827,075, Jan. 28, 1992, Pat. No. 5,296,959.

[30] Foreign Application Priority Data

Jan. 30, 1991 [JP] Japan .................................. 3-9862
Jan. 30, 1991 [JP] Japan .................................. 3-9863
Nov. 28, 1991 [JP] Japan .................................. 3-314621

[51] Int. Cl.$^6$ .................................................... G02B 5/08
[52] U.S. Cl. ........................... 359/855; 359/216; 359/900; 264/1.9
[58] Field of Search ............................... 359/855, 900, 359/212, 216–220, 223, 850; 264/1.1, 1.7, 1.9, 2.3, 2.4, 241, 268, 269, 255, 328.8; 425/96–98, 117, 123, 573

[56] References Cited

U.S. PATENT DOCUMENTS 4,101,365 7/1978 Fisii ........................................ 156/294
4,902,085 2/1990 Murakoshi et al. ..................... 359/216

FOREIGN PATENT DOCUMENTS 56-110904 9/1981 Japan .
57-37324 3/1982 Japan .
63-7639 1/1988 Japan .
63-229421 9/1988 Japan .
63-304224 12/1988 Japan .
63-304223 12/1988 Japan .
1-244918 9/1989 Japan .
3-243313 10/1991 Japan .

Primary Examiner—James Phan
Attorney, Agent, or Firm—Brinks Hofer Gilson & Lione

[57] ABSTRACT

A resin polygonal mirror having reflective facets each of which is made by injecting resin from a plurality of pin point gates or a single film gate. A core of the polygonal mirror is made of a different resin from the resin which is the material of the reflective facets. A mold of the polygonal mirror has side segments which are divided by parting lines extended from corners of the reflective facets.

6 Claims, 14 Drawing Sheets

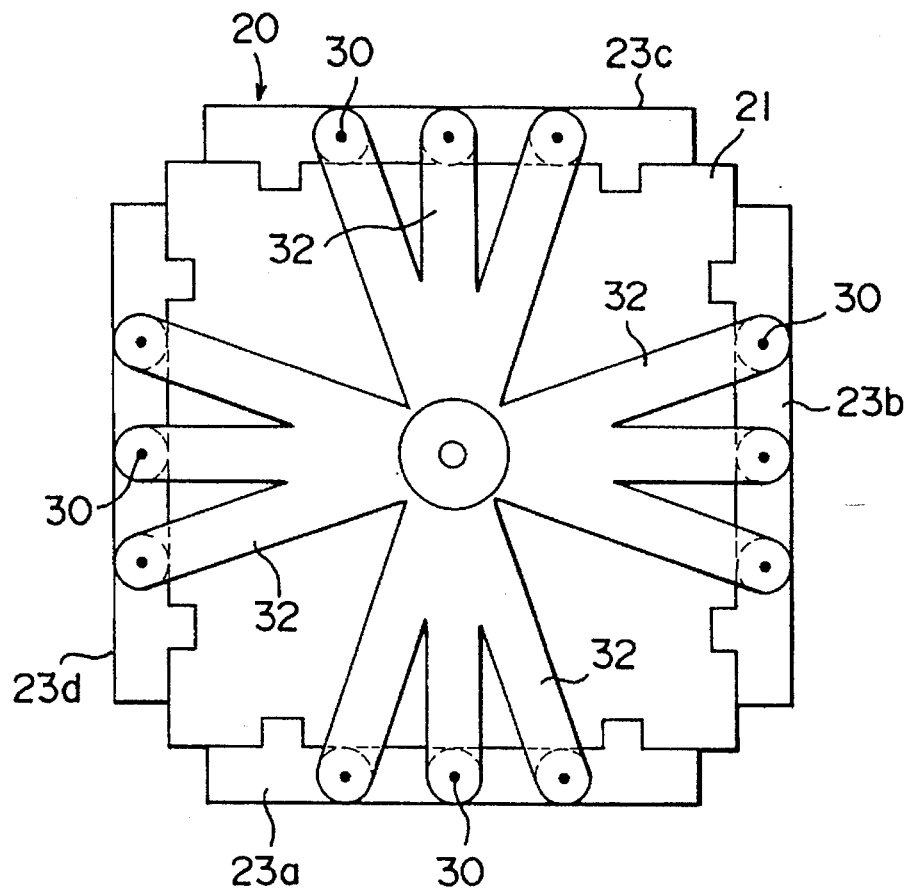
FIG. 6
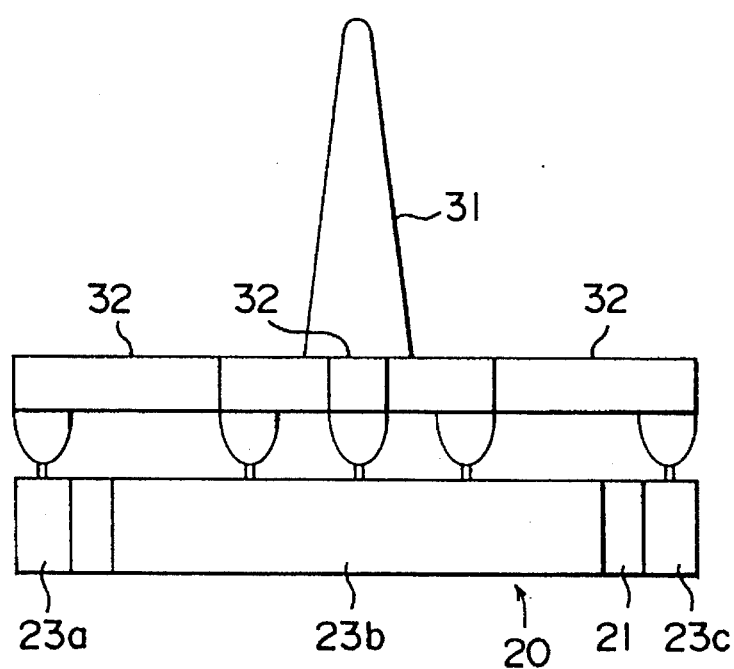

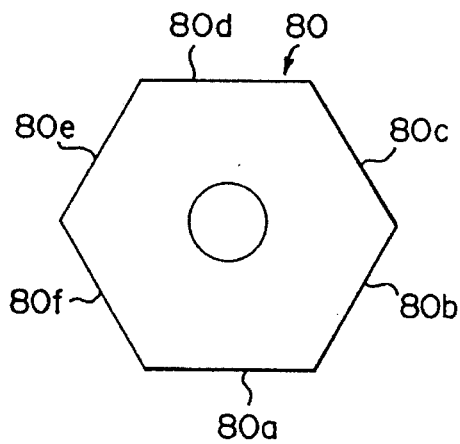
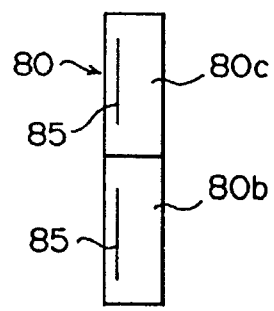
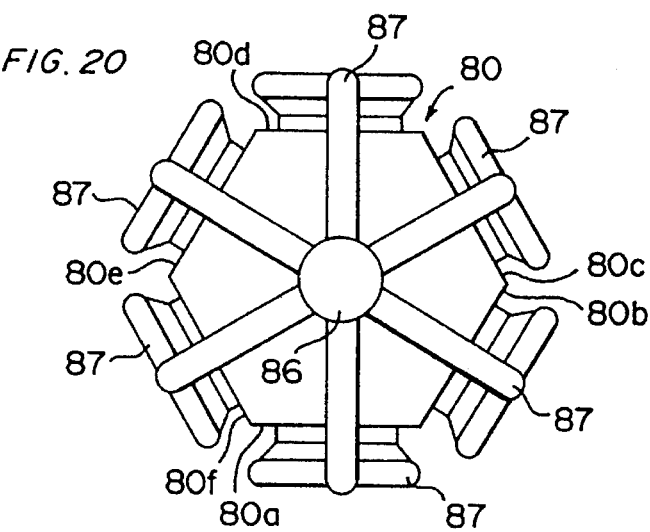
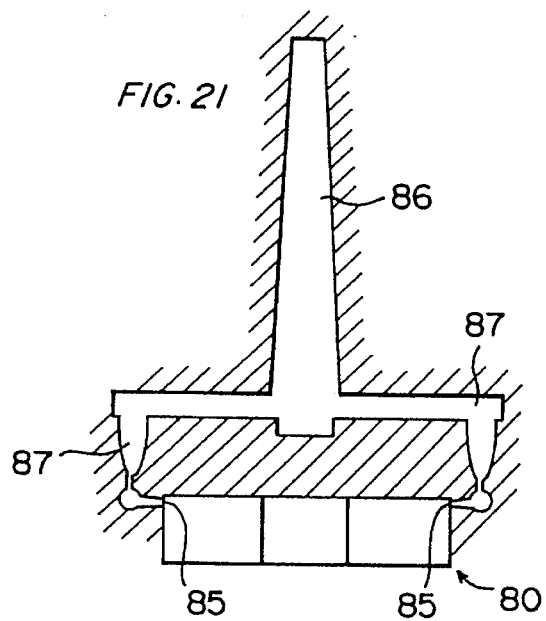

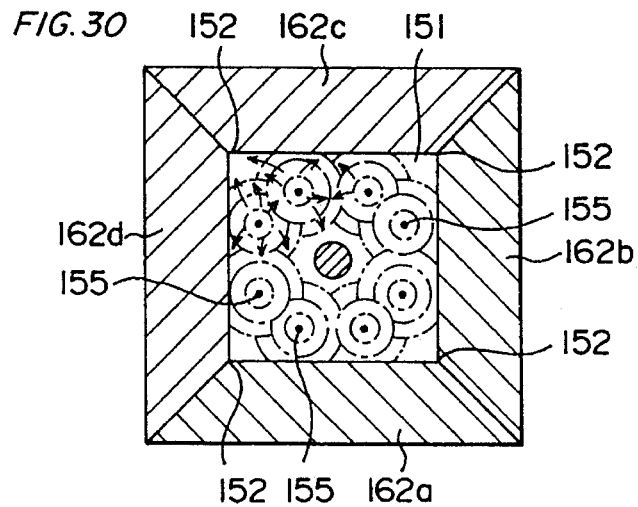
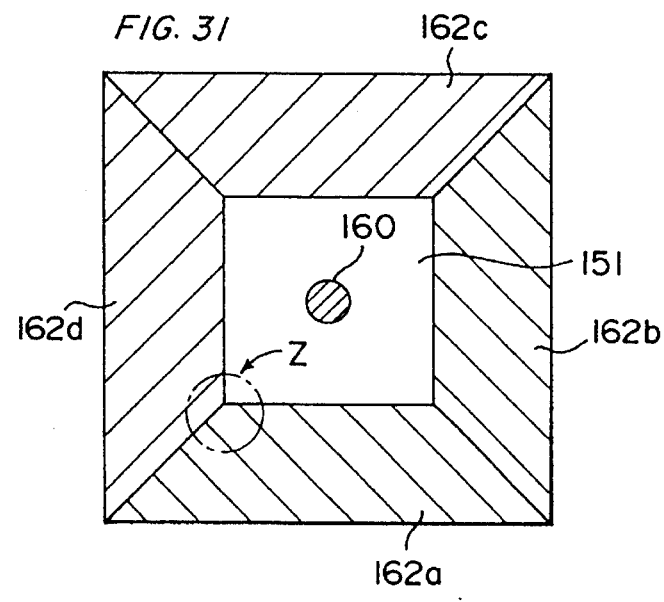
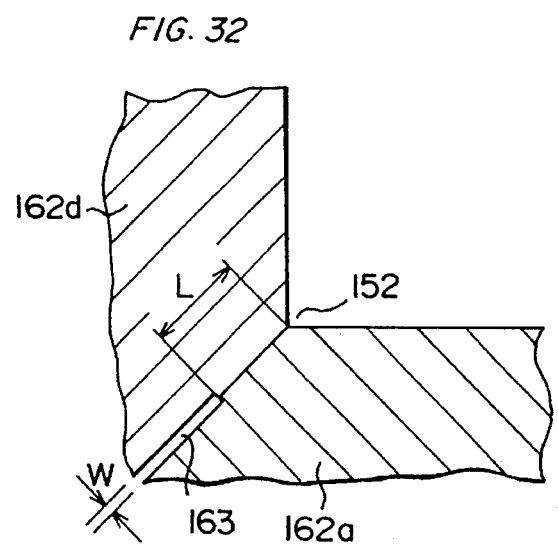

POLYGONAL MIRROR, AND MANUFACTURING PROCESS AND MOLD THEREOF

This application is a division of application Ser. No. 07/827,075, filed Jan. 28, 1992 now U.S. Pat. No. 5,296,959.

BACKGROUND OF THE INVENTION

1. Field of the Invention

The present invention relates to a polygonal mirror which is used in an optical beam scanning system, to a manufacturing process thereof, and to a mold used for manufacturing the polygonal mirror.

2. Description of Related Art

A polygonal mirror which has a plurality of reflective facets for deflecting an optical beam to a beam receiving surface is used in an optical beam scanning system.

Conventionally, a polygonal mirror has been made of aluminum alloy or optical glass. However, when aluminum alloy or optical glass is used, a large number of processes, including milling and grinding, or polishing, are required to realize a high quality polygonal mirror. The necessity of such a large number of processes results in high manufacturing cost. In addition, since the polygonal mirror made of metal or glass is heavy, a complicated and expensive drive system is required for driving the polygonal mirror at high speed.

Recently, therefore, resin has been tried to make a polygonal mirror in an injection molding method as disclosed in Japanese Patent Laid Open Publication Nos. 63-229421 and 63-304223. However, this method has not been developed enough to guarantee high quality optical characteristics, and particularly flatness of the reflective facets of the polygonal mirror.

SUMMARY OF THE INVENTION

An object of the present invention is to provide a resin polygonal mirror which has high quality optical surfaces.

Another object of the present invention is to provide a method of manufacturing a resin polygonal mirror which has high quality optical surfaces.

A further object of the present invention is to provide a polygonal mirror which has reflective facets whose effective areas which can be used as beam reflecting areas are large.

Furthermore, another object of the present invention is to provide a mold to form a polygonal mirror whose reflective facets have large effective areas.

According to one aspect of the present invention, the above objects can be achieved by a polygonal mirror comprising reflective facets, each of which is molded out of resin injected through a plurality of pin point gates. A plurality of pin point gates ensure that the resin pressure acts upon a side to form a reflective facet entirely and evenly. Therefore a flat and smooth reflective facet in an exact shape of predetermined dimensions can be formed.

A polygonal mirror according to another aspect of the present invention comprises reflective facets, each of which is molded out of resin injected through a film gate. A film gate enables linear injection. A reflective facet formed in this manner is free from a weld line, and therefore the facet is flat and smooth.

A polygonal mirror according to another aspect of the present invention comprises a core made of a first resin and reflective portions including reflective facets made of a second resin. The core and the reflective portions impose different restrictions on their materials, and a resin proper for the core and a resin proper for the reflective portions are selected separately. For example, a resin having good workability is used as the material of the reflective portions, and a resin having hardness, a low coefficient of linear expansion and/or low hygroscopicity is used as the material of the core.

A polygonal mirror according to another aspect of the present invention comprises mold parting lines on corners of reflective facets. Also, according to still another aspect of the present invention, a mold of a polygonal mirror comprises a same number of segments as the number of reflective facets of the polygonal mirror, the segments being divided by parting lines starting at corners of the polygonal mirror to be formed. During the molding, air in the cavity and gases generated from molten resin are collected at corners of the cavity. Then, the collected air and gases are ejected through gaps along the parting lines.

BRIEF DESCRIPTION OF THE DRAWINGS

These and other objects and features of the present invention will be apparent from the following description in connection with the preferred embodiments thereof in reference with the accompanying drawings, in which:

FIG. 5 is a plan view of the polygonal mirror shown in FIG. 4, a sprue and runners, showing their positional relationship;

FIG. 6 is a front view of the polygonal mirror, the sprue and the runners shown in FIG. 5;

FIG. 18 is a plan view of a polygonal mirror which is a seventh embodiment of the present invention;

FIG. 19 is a side view of the polygonal mirror shown in FIG. 18;

FIG. 20 is a plan view of the polygonal mirror shown in FIGS. 18 and 19, a sprue and runners, showing their positional relationship;

FIG. 21 is a sectional view of the sprue and the runners shown in FIG. 20;

FIG. 30 is a horizontal sectional view of the mold shown in FIG. 28 and 29, showing a flow of resin in the cavity;

FIG. 31 is a horizontal sectional view of the mold shown in FIG. 28 in a closed state;

FIG. 32 is an enlarged sectional view of a part Z of the mold shown in FIG. 31;

DESCRIPTION OF THE PREFERRED EMBODIMENTS

Some exemplary polygonal mirrors, and production methods and molds thereof according to the present invention are hereinafter described, referring to the accompanying drawings.

Figure 1:
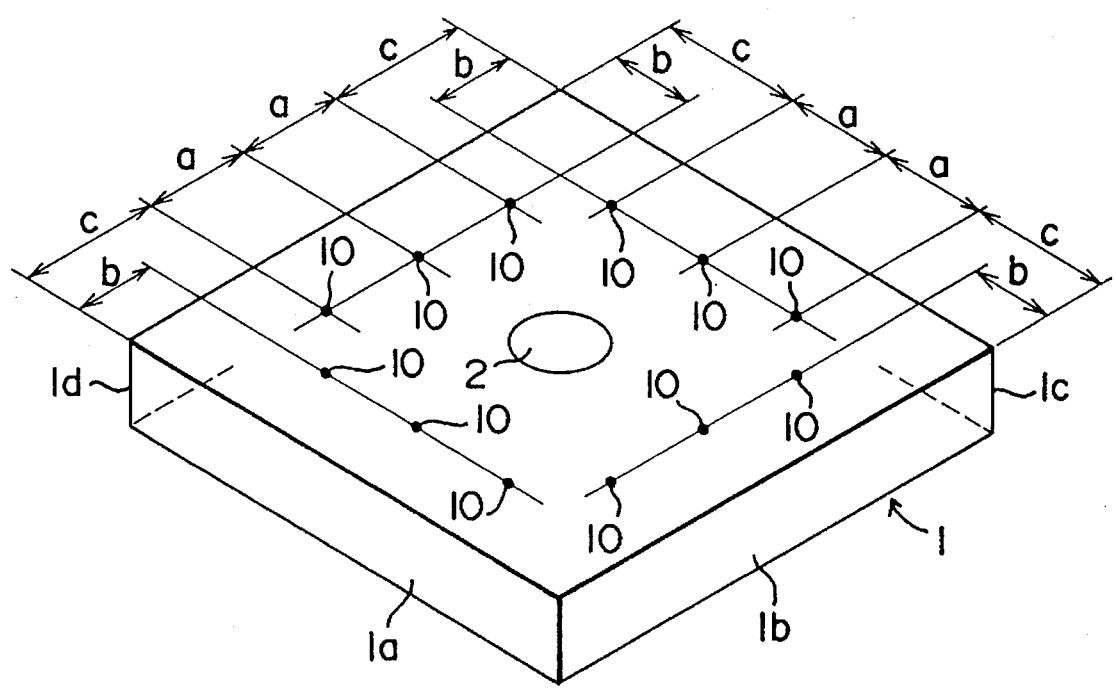
FIG. 1 is a perspective view of a polygonal mirror which is a first embodiment of the present invention.
Figure 2:
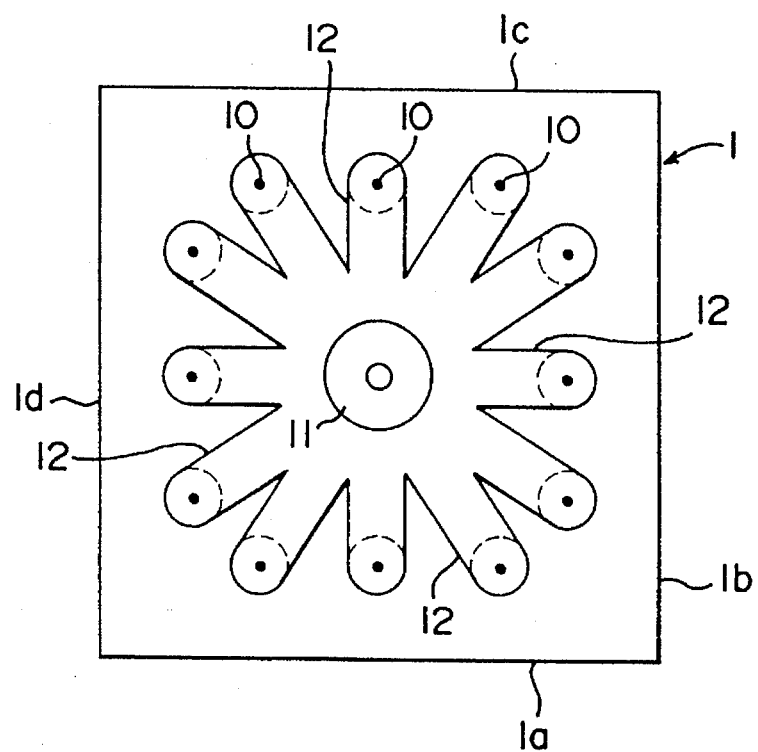
FIG. 2 is a plan view of the polygonal mirror shown in FIG. 1, a sprue and runners, showing their positional relationship.
Figure 3:
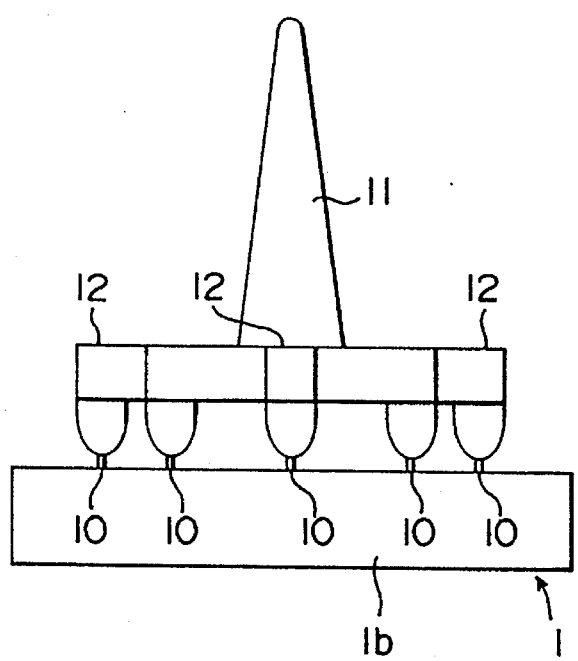
FIG. 3 is a front view of the polygonal mirror, the sprue and the runners shown in FIG. 2.

First Embodiment: FIGS. 1–3

A first embodiment is a polygonal mirror 1 which is made of a single kind of resin in an injection molding method. As shown in FIG. 1, the polygonal mirror 1 has four reflective facets 1a, 1b, 1c and 1d. The polygonal mirror 1 also has in the center a hole 2 in which a driving shaft is to be inserted. Numerals 10 denote positions where pin point gates through which resin is injected to mold the polygonal mirror 1 are placed. Three pin point gates 10 are placed at uniform intervals in a line in parallel with each reflective facet. Intervals among the pin point gates 10 in a line are referenced by "a". A distance between a reflective facet and a line of pin point gates 10 is referenced by "b". A distance between a corner and the closest pin point gate 10 is referenced by "c".

FIGS. 2 and 3 show positional relationship among the polygonal mirror 1, a sprue 11 and runners 12. The sprue 11 is placed in the center, and the runners 12 radiate from the sprue 11 to the pin point gates 10.

In order to form fine facets 1a through 1d, resin pressure on the facets 1a through 1d must be sufficient and uniform during the injection molding, and resin injected through the gates 10 should meet together, keeping such a high temperature as not to make remarkable weld lines. An arrangement of the pin point gates 10 which meets expressions b<a and b<c forms these situations. Further, it is preferred that the distance b between a reflective facet and a line of pin point gates is about a half of the interval a among the pin points gates. Intervals among pin point gates which are arranged in a line in parallel with a reflective facet should be uniform, but the uniformity has allowance of 30%.

Exemplary molding conditions are herewith shown. Polycarbonate is used as the material. Each gate is 1.2 mm in diameter. Molding temperature is 130° C. Injection speed is 10 mm/sec. Injection pressure is 500 kg/cm$^2$. Pressure after injection is 1000 kg/cm$^2$.

As described above, resin injection to mold the polygonal mirror 1 is done through the pin point gates 10 which are so placed that a plural number. (preferably a same number) of gates are arranged in parallel with each reflective facet. Compared with a case of providing a single pin point gate for each reflective facet, in the first embodiment, resin pressure acts upon the reflective facets entirely and uniformly, and thus the smoothness and flatness of the facets are improved. The inventors made an experiment to measure the smoothness and flatness of the reflective facets, using a Newton ring. According to the experiment, when using a single pin point gate for each facet, the facets were measured as $\lambda/4$ ($\lambda$: wave length of a laser beam, 780 nm). When providing three pin point gates for each reflective facet, the facets were measured as $\lambda/8$.

In the first embodiment, no gates are provided in corners of the reflective facets, and thereby injected resin reaches the corners last. Therefore weld lines show on the corners of the polygonal mirror 1, not on the reflective facets. Thus there is no fear that weld lines may deteriorate the smoothness of the reflective facets.

The sectional areas of the runners 12 are different in order that flows of molten resin from the sprue 11 to all the gates 10 through the runners 12 require the same time, that is, in order that the molten resin is injected through the gates 10 at the same time. If it is difficult to vary the sectional areas of the runners 12, inner diameters of the gates 10 may be varied to regulate the flow of the molten resin.

Figure 4:
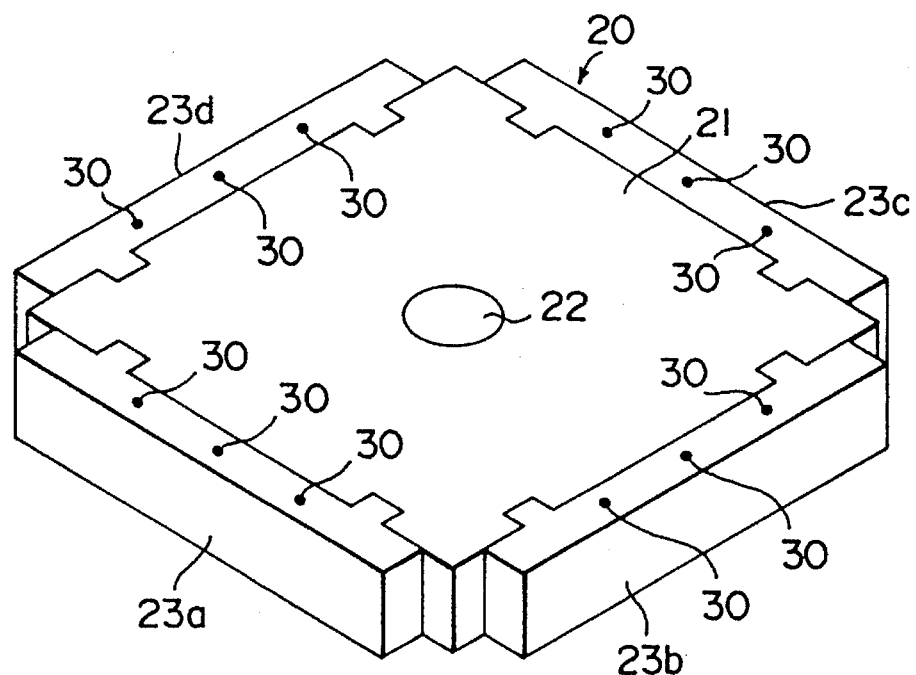
FIG. 4 is a perspective view of a polygonal mirror which is a second embodiment of the present invention.

Second Embodiment: FIGS. 4–6

A second embodiment is a polygonal mirror 20 which is made of two kinds of resins in an injection molding method. Referring to FIG. 4, the polygonal mirror 20 consists of a core 21 having a center hole 22, and reflective portions 23a, 23b, 23c and 23d. The polygonal mirror 20 is produced in an insert molding method or a multiple molding method. Pin point gates 30 through which molten resin is injected to make the reflective portions 23a through 23d are provided in the same manner as described in connection with the first embodiment. FIGS. 5 and 6 show positional relationship among the polygonal mirror 20, a sprue 31 and runners 32. Further, for resin injection to make the core 21, a single or more gates are provided at any places.

Generally a polygonal mirror is rotated at a high speed, 8,000 rpm or more, to scan a laser beam whose wave length is about 780 nm on a line. Therefore, materials of the polygonal mirror should have the following characteristics: (1) hardness (for prevention of deformation at the high speed rotation), (2) low coefficient of linear expansion (for formation of an accurate polygonal shape of predetermined dimensions and for flatness of reflective facets), (3) moisture resistivity (for adaptation to the environments) and (4) good workability (for smoothness of reflective facets). A resin which meets all these requirements is not readily available.

In the second embodiment, in order to obtain an efficient polygonal mirror as a whole, a resin which meets at least one of the material requirements (1), (2) and (3) is used for the core 21, and a resin which meets the requirement (4) is used for the reflective portions 23a through 23d. More specifically, for the core 21, a resin including hard filler such as glass fiber is used. For example, polyphenylene sulfide including glass fiber at a rate of 40%, liquid crystal polymer including glass fiber at a rate of 30%, or the like is used as the material of the core 21. As the material of the reflective portions 23a through 23d, a resin which has excellent workability, e.g., polycarbonate, acrylic resin, or the like is used to make smooth reflective facets.

Figure 7:
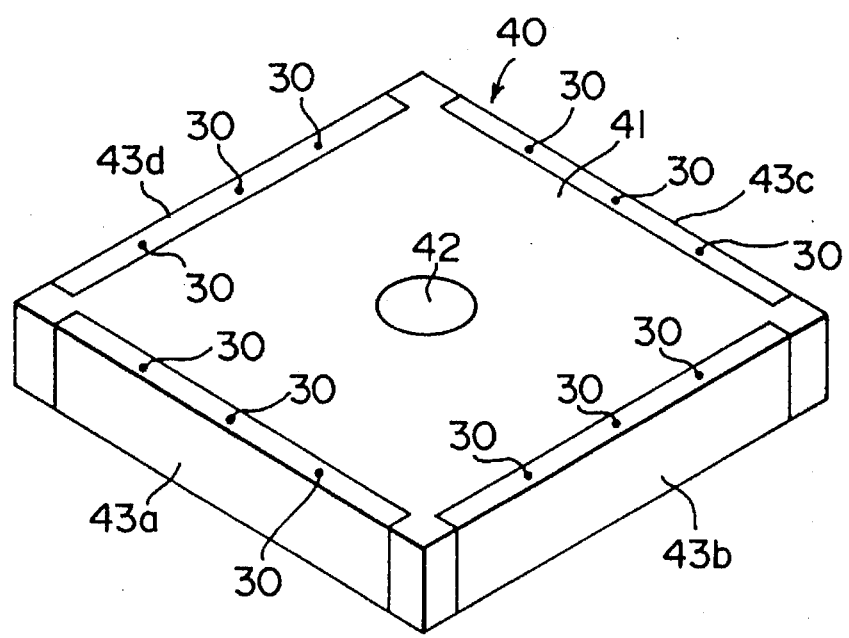
FIG. 7 is a perspective view of a polygonal mirror which is a third embodiment of the present invention.

Third Embodiment: FIG. 7

A third embodiment is a polygonal mirror 40 which is made of two kinds of resins in an injection molding method. Like the second embodiment, the polygonal mirror 40 consists of a core 41 having a center hole 42 and reflective portions 43a, 43b, 43c and 43d, and the core 41 and the reflective portions 43a through 43d are made of different resins. The distinctive point of the third embodiment from the second embodiment is that four corners of the core 41 are extended to the corners of the reflective portions 43a through 43d. Positions of pin point gates 30 and selection of materials are the same as described in connection with the first and the second embodiments.

Figure 8:
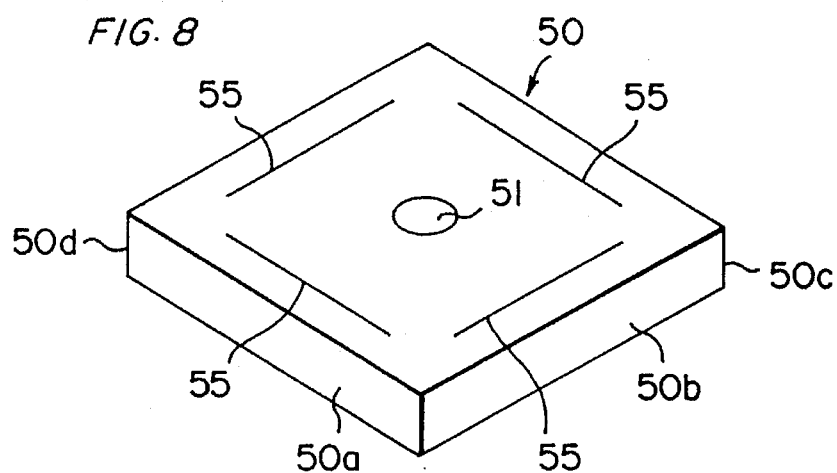
FIG. 8 is a perspective view of a polygonal mirror which is a fourth embodiment of the present invention.
Figure 9:
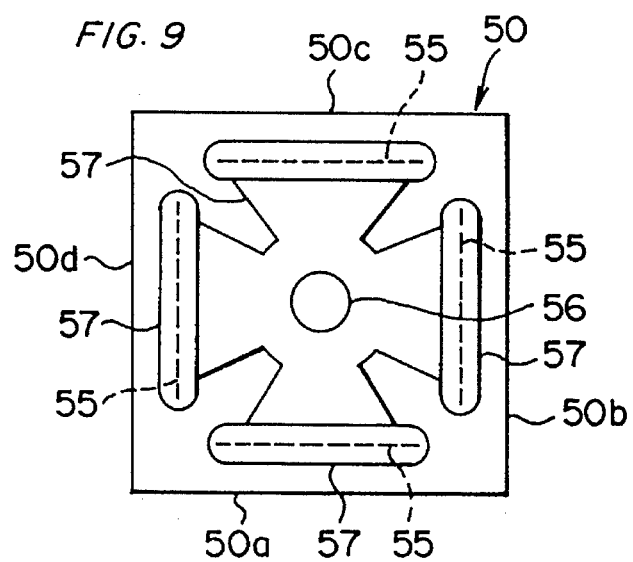
FIG. 9 is a plan view of the polygonal mirror shown in FIG. 8, a sprue and runners, showing their positional relationship.
Figure 10:
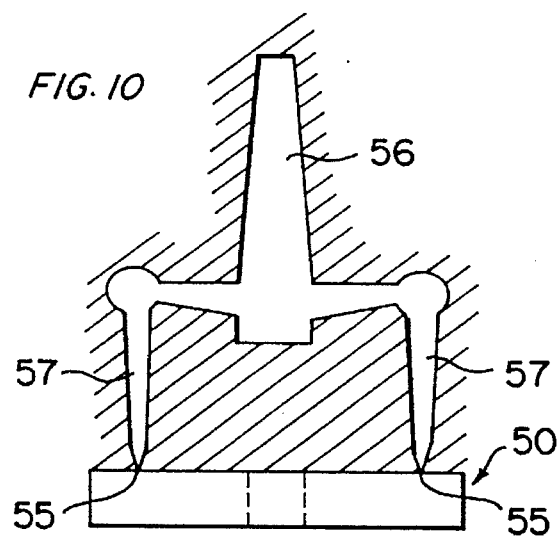
FIG. 10 is a sectional view of the sprue and the runners shown in FIG. 9.
Figure 11:
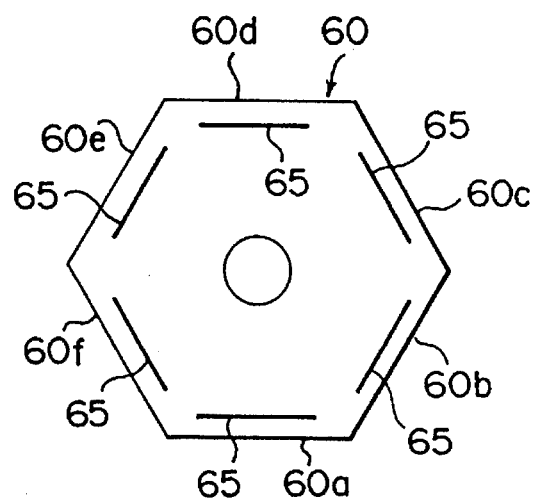
FIG. 11 is a plan view of a polygonal mirror which is a fifth embodiment of the present invention.
Figure 12:
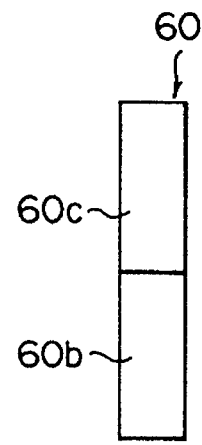
FIG. 12 is a side view of the polygonal mirror shown in FIG. 11.

Fourth Embodiment: FIGS. 8–10

A fourth embodiment is a polygonal mirror 50 which is made of a single kind of resin in an injection molding method using film gates. A film gate enables linear injection. Four Film gates 55 are provided on a plane which is to be an upper surface of the polygonal mirror 50, and the gates 55 are in parallel with reflective facets 50a, 50b, 50c and 50d respectively. Molten resin is injected through the film gates 50 in the same direction. Like the first embodiment, polycarbonate. acryl or the like is used as the material of the polygonal mirror 50. Also, a hole 51 is formed in the center of the polygonal mirror 50 so that a driving shaft for rotation of the polygonal mirror 50 can be inserted therein.

FIGS. 9 and 10 show positional relationship among the polygonal mirror 50, a sprue 56 and runners 57. The runners 57 radiate from the sprue 56. In order that the molten resin flowing frown the sprue 56 through each runner 57 reaches every portion of each film gate 55 at the same time, every portion of a section of each runner 57 has a different clearance. One film gate 55 is provided for one reflective facet, and the film gates 55 are arranged in such a manner to have the same positional relationship with the respective reflective facets 50a through 50d. The runners 57 extended to the gates 55 are in the same configuration. Thereby pressure of a molding machine can be transmitted to the reflective facets evenly, and the flatness and smoothness of the facets are improved.

In the above method, the resin injected through the film gates 55 flows in all directions and converges together at corners of the reflective facets 50a through 50d. In other words, there is no fear that weld lines may show on effective areas of the reflective facets 50a through 50d. Also, resin pressure and temperature are easy to regulate in this method, compared with the method using pin point gates. The reflective facets made in this method were measured as $\lambda/8$, which is the same as those of the first embodiment.

Fifth Embodiment: FIGS. 11–14

Figure 13:
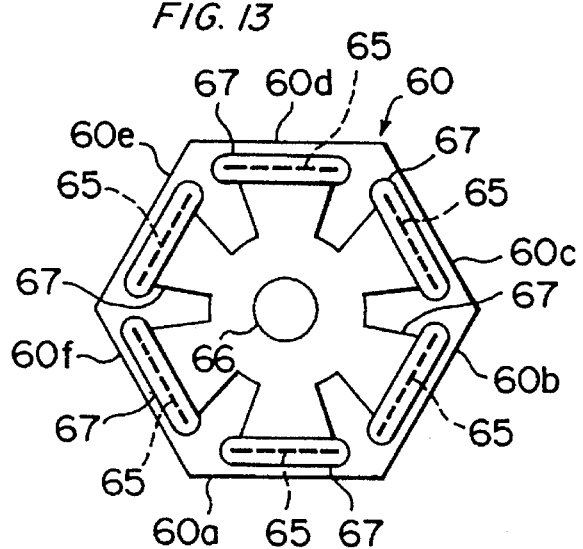
FIG. 13 is a plan view of the polygonal mirror shown in FIGS. 11 and 12, a sprue and runners, showing their positional relationship.
Figure 14:
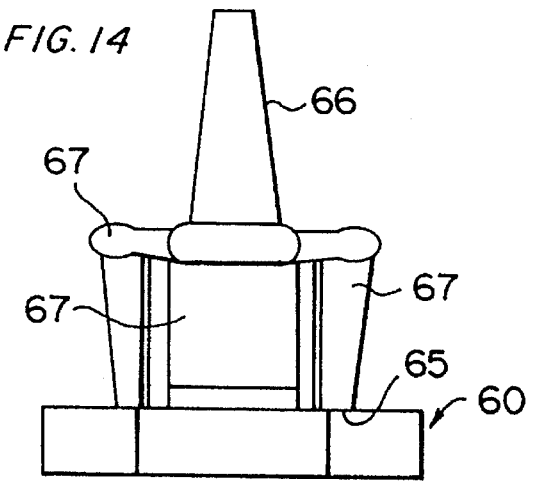
FIG. 14 is a front view of the polygonal mirror, the sprue and the runners shown in FIG. 13.

A fifth embodiment is a six-faceted polygonal mirror 60 which is made of a single kind of resin in an injection molding method using film gates. Six film gates 65 are provided on a plane which is to be an upper surface of the polygonal mirror 60, and the gates 65 are in parallel with the reflective facets 60a, 60b, 60c, 60d, 60e and 60f respectively. FIGS. 13 and 14 show positional relationship among the polygonal mirror 60, a sprue 66 and runners 67. The positions of the film gates 65 and the configuration of the runners 67 include the same technical ideas as those in the fourth embodiment. The film gates 65 are arranged in such a manner to have the same positional relationship with the respective reflective facets, and the runners 67 are so made that molten resin flowing through the runners 67 reaches every portion of all the film gates 65 at the same time.

Figure 15:
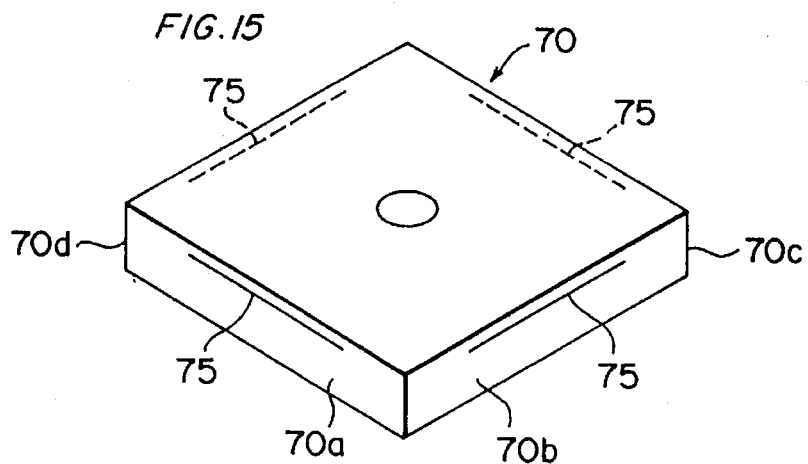
FIG. 15 is a perspective view of a polygonal mirror which is a sixth embodiment of the present invention.
Figure 16:
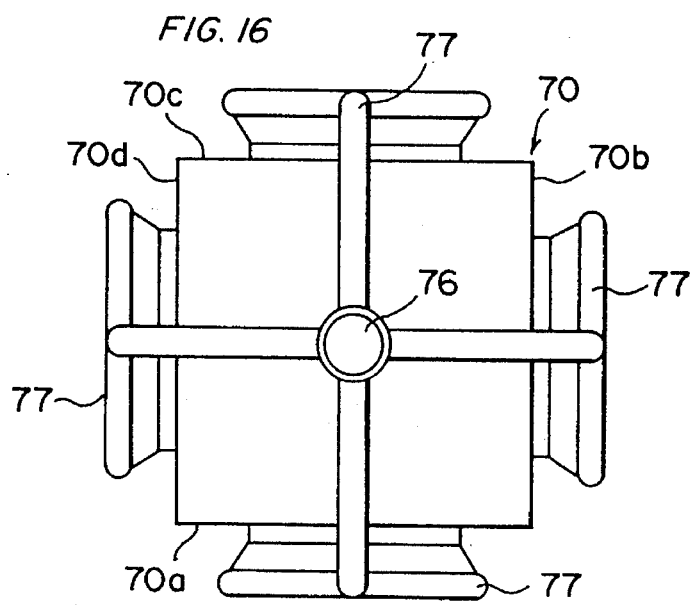
FIG. 16 is a plan view of the polygonal mirror shown in FIG. 15, a sprue and runners, showing their positional relationship.
Figure 17:
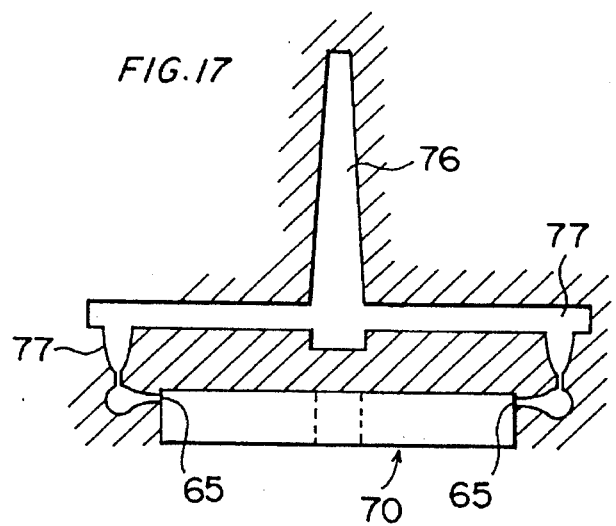
FIG. 17 is a sectional view of the sprue and the runners shown in FIG. 16.

Sixth Embodiment: FIGS. 15–17

A sixth embodiment is a polygonal mirror 70 which is made of a single kind of resin in an injection molding method using film gates. The polygonal mirror 70 has four reflective facets 70a, 70b, 70c and 70d, and each reflective facet is provided with a film gate 75. The film gates 75 are placed on sides which are to be reflective facets at upper portions. Molten resin is injected through the gates 75, that is, from the sides of the polygonal mirror 70. The film gates 75 are positioned out of effective reflective areas of the facets 70a through 70d.

FIGS. 16 and 17 show positional relationship among the polygonal mirror 70, a sprue 76 and runners 77. The runners 77 are so made that the molten resin flowing from the sprue 76 can reach every portion of the gates 75 at the same time. The film gates 75 are in parallel with the respective reflective facets 70a through 70d, and the resin is injected through the gates 75 in the same direction, viewed from every reflective facet. In this structure, pressure of a molding machine can be transmitted to the reflective facets 70a through 70d evenly, and the flatness and smoothness of the reflective facets are improved.

Seventh Embodiment: FIGS. 18–21

A seventh embodiment is a six-faceted polygonal mirror 80 as shown in FIGS. 18 and 19. In the seventh embodiment, film gates 85 are placed on sides which are to be reflective facets 80a, 80b, 80c, 80d, 80e and 80f in the same manner as the sixth embodiment, and a single kind of resin is injected through the film gates 85 to mold the polygonal mirror 80. FIGS. 20 and 21 show positional relationship among the polygonal mirror 80, a sprue 86 and runners 87.

Figure 22:
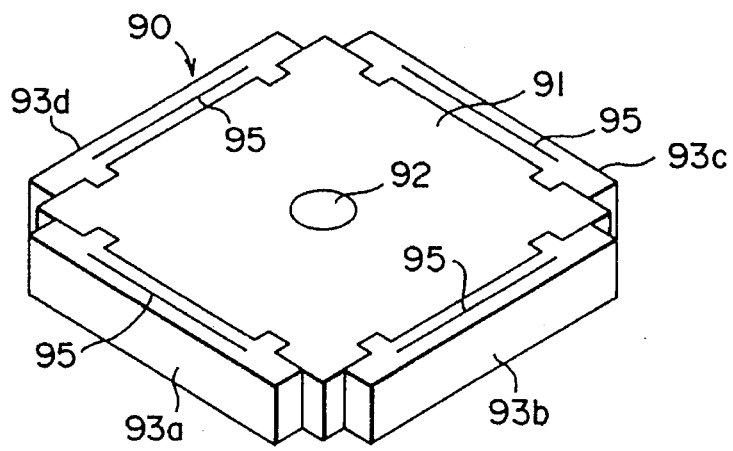
FIG. 22 is a perspective view of a polygonal mirror which is an eighth embodiment of the present invention.
Figure 23:
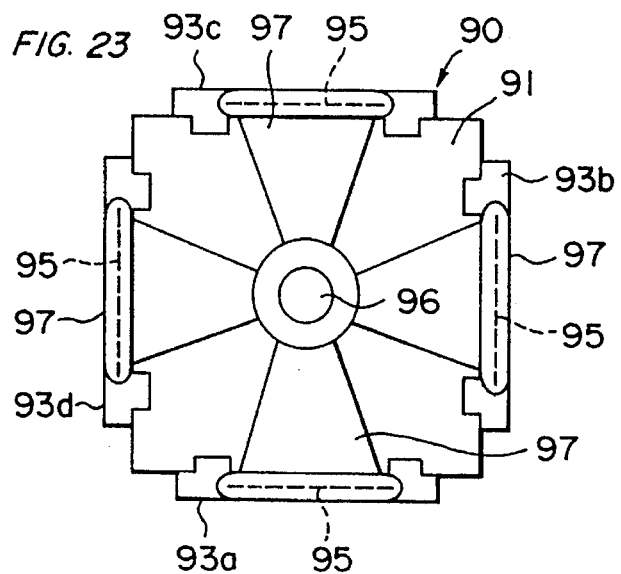
FIG. 23 is a plan view of the polygonal mirror shown in FIG. 22, a sprue and runners, showing their positional relationship.
Figure 24:
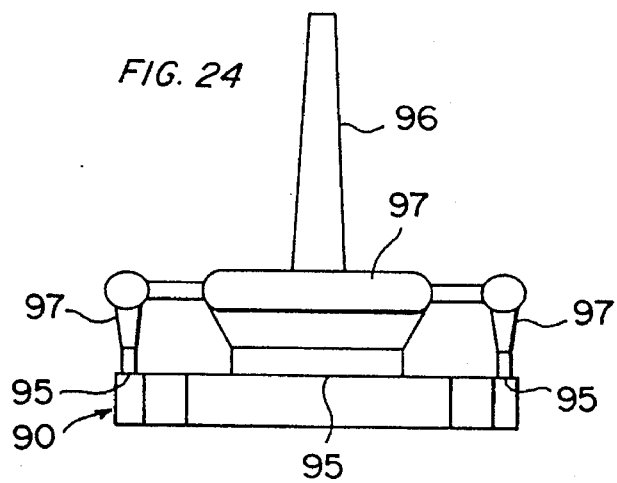
FIG. 24 is a front view of the polygonal mirror, the sprue and the runners shown in FIG. 23.

Eighth Embodiment: FIGS. 22–24

An eighth embodiment is a polygonal mirror 90 which is made of two kinds of resins in an insert molding method or a multiple molding method like the second embodiment. A core 91 having a center hole 92 is made in a general molding method which can use any type of gate. Four reflective portions 93a, 93b, 93c and 93d are made in a molding method using film gates. The film gates 95 are provided on planes which are to be upper surfaces of the reflective portions respectively.

FIGS. 23 and 24 show positional relationship among the polygonal mirror 90, a sprue 96 and runners 97. Positions and configurations of the sprue 96 and the runners 97 are the same as those in the fourth embodiment shown in FIGS. 9 and 10. The reason why different kinds of resins are used to make the core 91 and the reflective portions 93a through 93d is the same as described in connection with the second embodiment.

Figure 25:
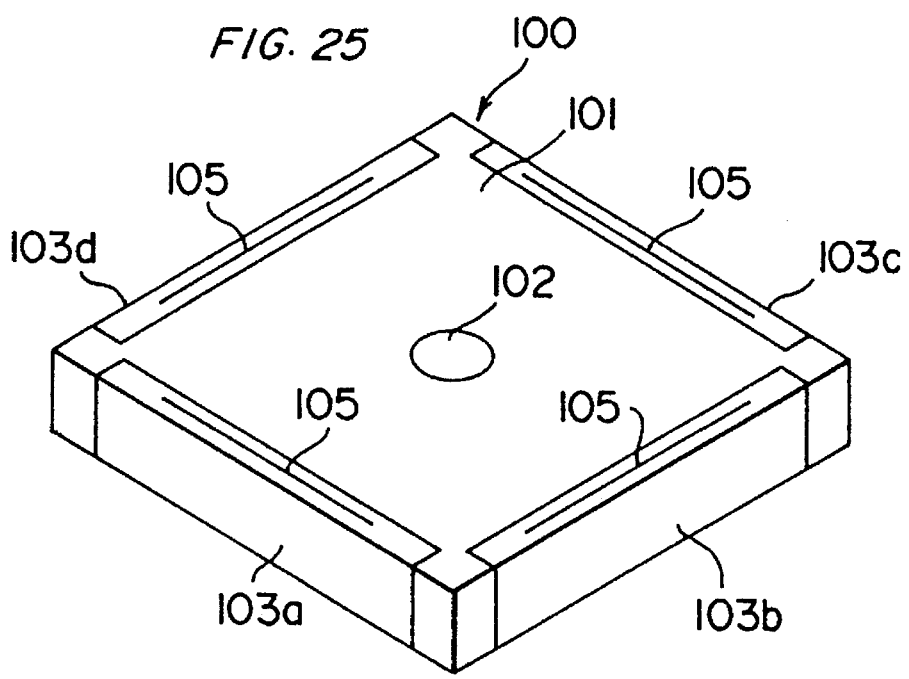
FIG. 25 is a perspective view of a polygonal mirror which is a ninth embodiment of the present invention.

Ninth Embodiment: FIG. 25

A ninth embodiment is a polygonal mirror 100 which is made of two kinds of resins. Like the third embodiment, a core 101 having a center hole 102, and reflective portions 103a, 103b, 103c and 103d are molded out of different kinds of resins. Four film gates 105 are placed on planes which are to be upper surfaces of the reflective portions 103a through 103d respectively, and the resin which is the material of the reflective portions 103a through 103d is injected through the film gates 105. Positions and shapes of a sprue and runners are the same as those shown in FIGS. 9 and 10. Selection of the materials is made in the same manner as described in connection with the second embodiment.

Figure 26:
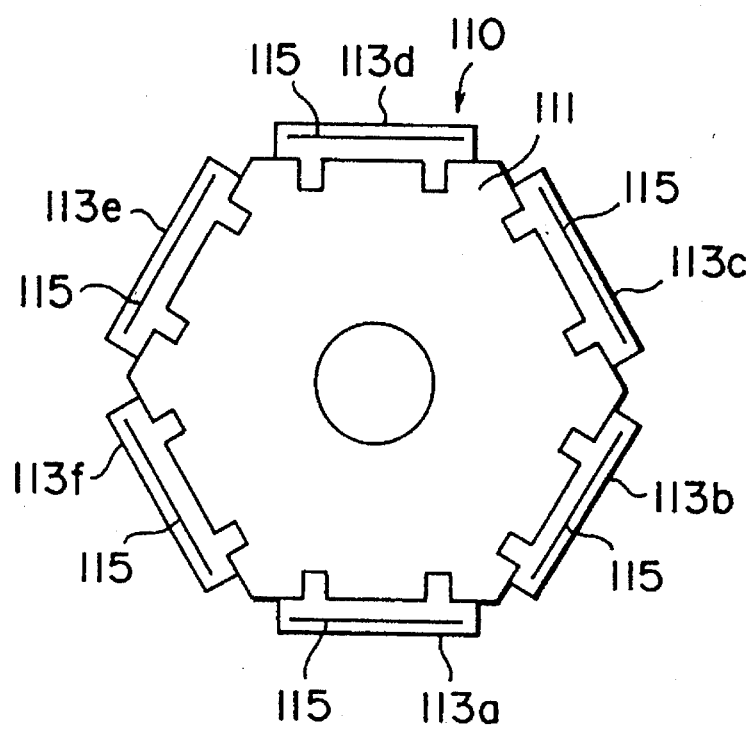
FIG. 26 is a plan view of a polygonal mirror which is a tenth embodiment of the present invention.

Tenth Embodiment: FIG. 26

A tenth embodiment is a six-faceted polygonal mirror 110 which is made of two kinds of resins in an insert molding method or a multiple molding method. The polygonal mirror 110 has six reflective portions 113a, 113b, 113c, 113d, 113e and 113f on the six sides of a core 111. The reflective portions 113a through 113f are molded out of a resin injected through film gates 115. Positions and shapes of a sprue and runners are the same as those shown in FIGS. 9 and 10. Selection of the materials is made in the same manner as described in connection with the second embodiment.

Eleventh Embodiment: FIGS. 27–33

Figure 27:
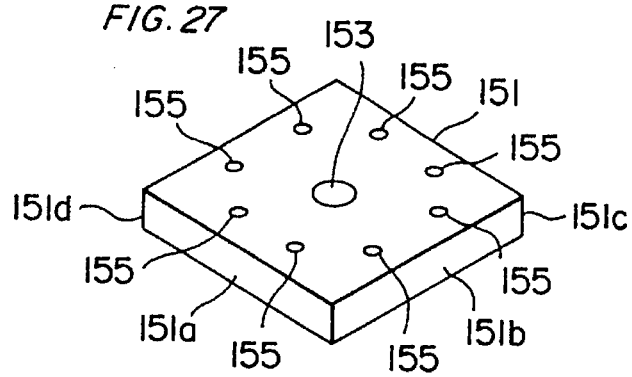
FIG. 27 is a perspective view of a polygonal mirror which is an eleventh embodiment of the present invention.

FIG. 27 shows a polygonal mirror 151 of an eleventh embodiment. The polygonal mirror 151 has four reflective facets 151a, 151b, 151c and 151d, and a center hole 153 in which a driving shaft is to be inserted. Numerals 155 denote positions of pin point gates through which molten resin is injected to mold the polygonal mirror 151. Two pin point gates 155 are provided for each reflective facet.

Figure 28:
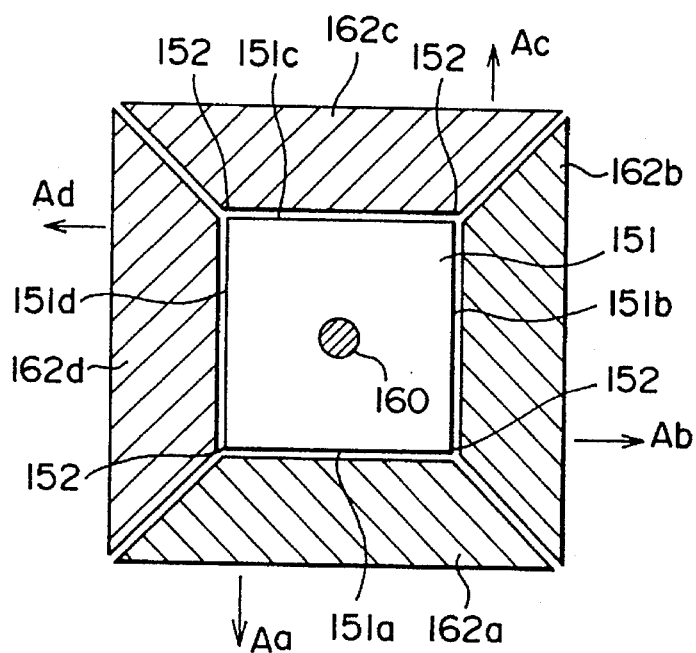
FIG. 28 is a horizontal sectional view of a mold of the polygonal mirror shown in FIG. 27, showing its general structure.
Figure 29:
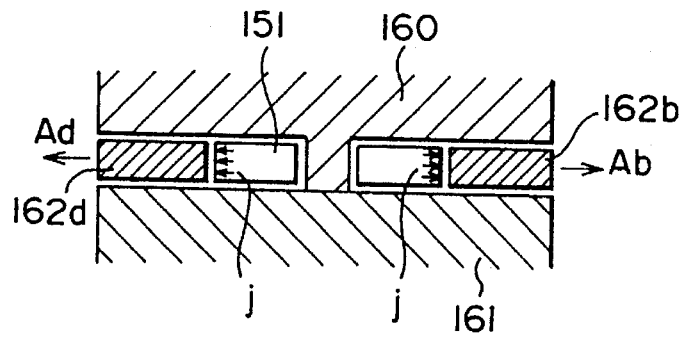
FIG. 29 is a center vertical sectional view of the mold shown in FIG. 28.

FIGS. 28 and 29 show a mold of the polygonal mirror 151 schematically. The mold consists of an upper mold 160 which is fixed in a specified position, a lower mold 161 which is movable up and down in FIG. 29, and side segments 162a, 162b, 162c and 162d which are horizontally slidable. The side segments 162a through 162d are to form the reflective facets 151a through 151d, and as shown in FIG. 28, parting lines of the side segments 162a through 162d are extended lines of diagonal lines from four corners of the reflective facets.

FIGS. 30 and 31 show a state that the mold is closed. Molten resin such as polycarbonate is injected through a total of eight pin point gates 155. Referring to FIG. 30, the injected molten resin diffuses in a cavity of the mold as indicated by a dashed line and partly by arrows, and finally the molten resin reaches the corners 152. Gasses generated at the time of injection and air in the cavity are collected in the corners 152, and the gases and the air are ejected through gaps along the parting lines of the side segments 162a through 162d. Thus pressure transmission and fluidity of the resin is fine, and the resin can flow to the edges of the side segments 162a through 162d. Thereby the flatness and smoothness of the reflective facets 151a through 151d can be improved even around the corners. This enlarges a flat area of the reflective facets 151a through 151d, that is, a high quality optical area which can be used for laser beam reflection. Also, this molding method reduces the fraction defective and lengthens the life of the mold.

In the eleventh embodiment, in order to promote the ejection of gases and air from the cavity, further slits 163 of a width W are formed along the parting lines of the side segments 162a through 162d, from positions which are away from the corners 152 by a distance L.

After the resin hardens, the mold is opened. At that time, the side segments 162a through 162d are slid in directions of arrows Aa, Ab, Ac and Ad indicated in FIG. 28 respectively. The moving directions of the side segments 151a through 151d for the opening of mold are perpendicular to the respective reflective facets 151a through 151d. During the injection of resin, pressure of the molten resin acts upon inner walls of the side segments 162a through 162d at a right angle as indicated by arrows j in FIG. 29. When the side segments 162a through 162d awe slid in the directions perpendicular to the reflective facets 151a through 151d, stresses which may deform the reflective facets can be relieved evenly and instantly. Thus, in this method, a polygonal mirror whose reflective facets have fine flatness and an accurate angle can be produced.

Figure 33:
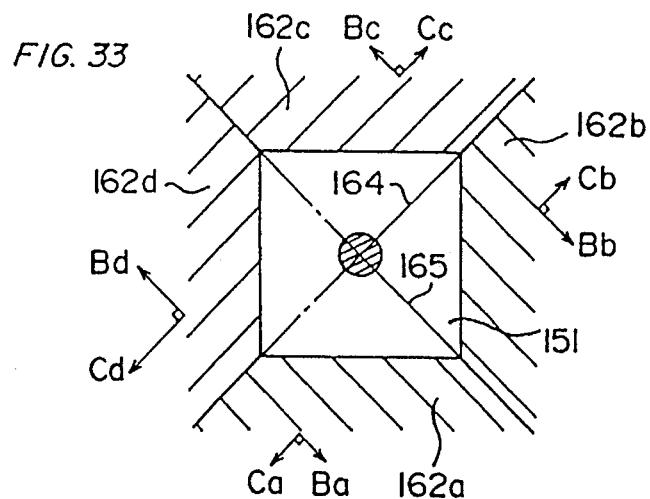
FIG. 33 is a horizontal sectional view of the mold shown in FIG. 28, showing ways of opening the mold.

Directions in which the side segments 162a through 162d can be slid to open the mold are not limited to the directions shown in FIG. 28. FIG. 33 shows another way of sliding the side segments 162a through 162d. Specifically, the side segments 162a and 162b are slid in a direction perpendicular to a diagonal, that is, in a direction indicated by arrows Ba and Bb, and the side segments 162c and 162d are slid in a direction perpendicular to the other diagonal, that is in a direction indicated by arrows Bc and Bd. Reversely, the side segments 162a and 162d can be slid in a direction perpendicular to a diagonal, that is, in a direction indicated by arrows Ca and Cd, and the side segments 162b and 162c can be slid in a direction perpendicular to the other diagonal, that is, in a direction indicated by arrows Cb and Cc.

Further, all the side segments 162a through 162d may be slid in different directions. The side segments 162a through 162d can be slid in directions indicated by arrows Ba, Cb, Bc and Cd respectively. Likewise the side segments 162a through 162d can be slid in directions indicated by arrows Ca, Bb, Cc and Bd respectively.

Figure 34:
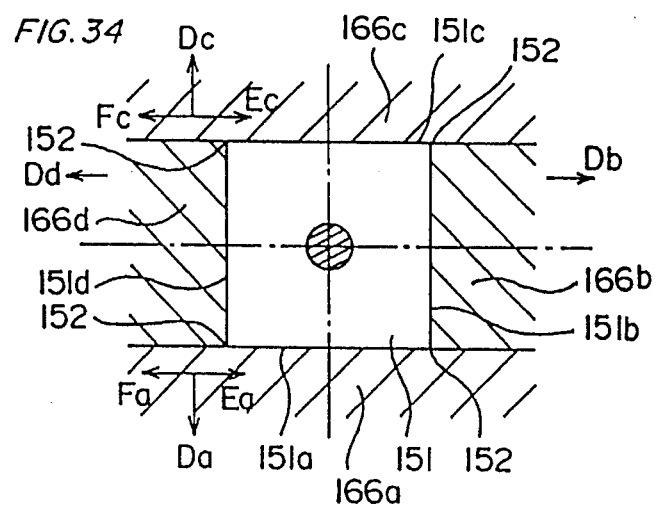
FIG. 34 is a horizontal sectional view of a mold which is a twelfth embodiment of the present invention, showing its general structure.

Twelfth Embodiment: FIG. 34

A twelfth embodiment is basically the same as the eleventh embodiment. Parting lines of side segments of the twelfth embodiment are different from those of the eleventh embodiment.

As shown in FIG. 34, parting lines of side segments 166a, 166b, 166c and 166d are lines extended straight from the reflective facets 151a and 151c. Directions in which the side segments 166a through 166d can be slid to open the mold are as follows. The side segment 166a is slid in a direction of arrow Da, arrow Ea or arrow Fa. The side segment 166b is slid in a direction of arrow Db. The side segment 166c is slid in a direction of arrow Dc, arrow Ec or arrow Fc. The side segment 166d is slid in a direction of arrow Dd.

Figure 35:
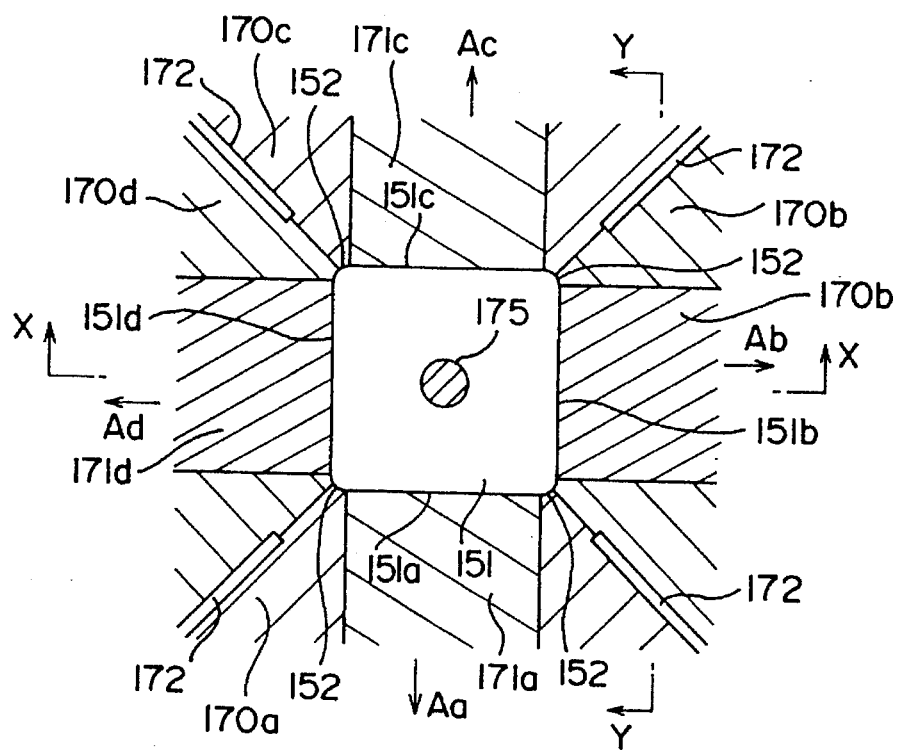
FIG. 35 is a horizontal sectional view of a mold which is a thirteenth embodiment of the present invention, showing its general structure.
Figure 36:
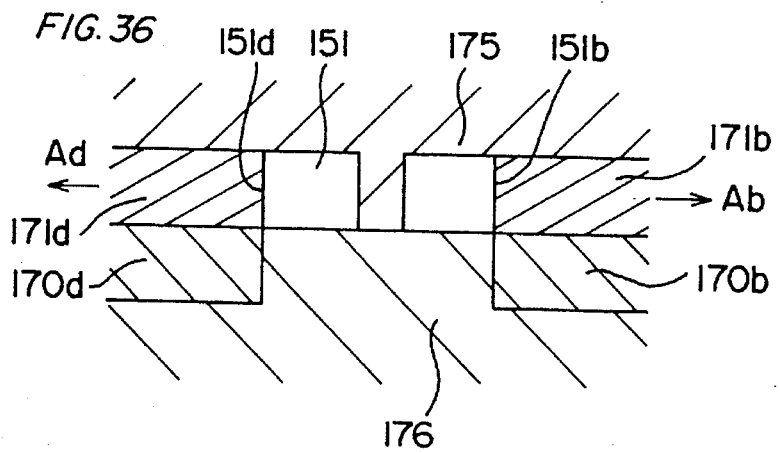
FIG. 36 is a sectional view of the mold shown in FIG. 35, crossed along a line X—X.
Figure 37:
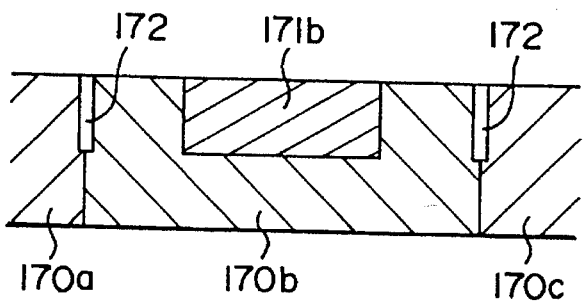
FIG. 37 is a sectional view of the mold shown in FIG. 35, crossed along a line Y—Y.

Thirteenth Embodiment: FIGS. 35–37

A thirteenth embodiment is a modification of the eleventh embodiment. The side segments are modified in order to round off the corners 152 of the reflective facets. Side segments 171a, 171b, 171c and 171d are mounted and fixed on base side segments 170a, 170b, 170c and 170d whose parting lines are extended lines of diagonals. Inner surfaces of the side segments 171a through 171d correspond to substantially the entire reflective facets 151a, 151b, 151c and 151d except for the corners 152. In opening the mold, the side segments 171a through 171d are slid in directions of arrow Aa, Ab, Ac and Ad respectively together with the base side segments 170a through 170d. Slits 172 for promoting the ejection of gases and air from the cavity are formed on the parting lines of the base side segments 170a through 170d. Further, in FIG. 36, numeral 175 is an upper mold, and numeral 176 is a lower mold.

The purpose of rounding off the corners 152 of the polygonal mirror 151 is inhibiting a whistle during rotation of the polygonal mirror 151 to scan a laser beam. If four-parted side segments like in the eleventh and twelfth embodiments are used to mold a polygonal mirror having rounded-off corners, end portions of inner walls of the side segments must be rounded off and polished, but this is difficult. In the thirteenth embodiment, therefore, the base side segments 170a through 170d and the side segments 171a through 171d are used, and surfaces facing the side segments 171a through 171d are finished as reflective facets. In this method, the base side segments 171a through 171d work to round off the corners 152, and the side segments 171a through 171d work to form flat and smooth reflective facets 151a through 151d of an accurate dividing angle. A dividing angle means an angle at which a line from the center of rotation of the polygonal mirror to the middle of each reflective facet crosses the reflective facet, and in this embodiment the dividing angle must be 90 degrees.

In the thirteenth embodiment, effective gas and air ejection from the cavity and effective stress relieving are sufficiently achieved by providing the slits 172 and sliding the side segments 171a through 171d in directions perpendicular to the reflective facets 151a through 151d respectively.

Figure 38:
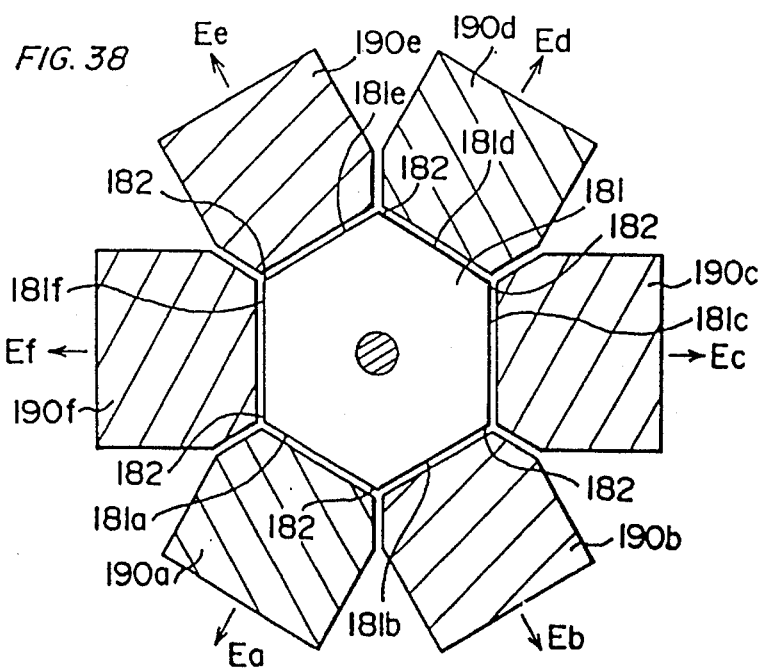
FIG. 38 is a horizontal sectional view of a mold which is a fourteenth embodiment of the present invention, showing its general structure.

Fourteenth Embodiment: FIG. 38

FIG. 38 shows a polygonal mirror 181 of a fourteenth embodiment having six reflective facets 181a, 181b, 181c, 181d, 181e and 181f, and a mold thereof.

The mold includes side segments 190a, 190b, 190c, 190d, 190e and 190f for forming the mirror facets 181a through 181e, and parting lines of the side segments 190a through 190f are extended lines of diagonals. In opening the mold, the side segments 190a through 190f are slid in directions perpendicular to the respective reflective facets 180a through 180f as indicated by arrows Ea through Ef.

Other Embodiments

Although the present invention has been described in connection with the preferred embodiments thereof, it is to be noted that various changes and modifications are apparent to those who are skilled in the art. Such changes and modifications are to be understood as being within the scope of the present invention as defined by the appended claims.

For example, the polygonal mirror may be made to have not only four or six reflective facets but also eight reflective facets. The reflective facets may be curved surfaces of a specified curvature or aspherical surfaces as well as flat surfaces.

Further, the part of the mold other than the side segments, that is, the upper mold and the lower mold may have any structure.

What is claimed is:

1. A method for producing a resin polygonal mirror having a plurality of reflective facets, the method comprising the steps of:

forming a cavity in the shape of the polygonal mirror to be produced; and injecting molten resin into the cavity through a film gate corresponding to each of the reflective facets to be formed.

2. The polygonal mirror production method of claim 1, wherein the film gates are disposed on a plane which is to be an upper surface of the polygonal mirror.

3. The polygonal mirror production method of claim 1, wherein the film gates are disposed on a plane which is to be a lower surface of the polygonal mirror.

4. The polygonal mirror production method of claim 1, wherein the film gates are disposed on planes which are to be the reflective facets, out of effective reflecting areas.

5. The polygonal mirror production method of claim 1, wherein the film gates are placed in parallel with the reflective facets.

6. The polygonal mirror production method of claim 1, wherein the molten resin injected through the film gates flows in a same direction, viewed from every reflective facet.

\* \* \* \* \*